United States Patent

[11] 3,592,507

[72] Inventor Edmond R. Gionet
 Warren, Mich.
[21] Appl. No. 850,564
[22] Filed Aug. 15, 1969
[45] Patented July 13, 1971
[73] Assignee General Motors Corporation
 Detroit, Mich.

[54] RESTRAINT BELT LOCK
 5 Claims, 5 Drawing Figs.
[52] U.S. Cl. .................................................. 297/388,
 297/386, 297/389
[51] Int. Cl. .................................................. A62b 35/60
[50] Field of Search ...................................... 242/107.4,
 107.2; 188/65.5, 65.4, 65.1; 297/388, 389, 386,
 385, 384; 182/5

[56] References Cited
 UNITED STATES PATENTS

| | | | |
|---|---|---|---|
| 3,227,489 | 1/1966 | Stubblefield | 292/107.2 |
| 3,265,440 | 8/1966 | Board et al. | 297/388 |
| 3,287,062 | 11/1966 | Board et al. | 297/385 X |
| 3,375,994 | 4/1968 | Wohlert et al. | 242/107.2 |
| 3,389,765 | 6/1968 | Pressley, Sr. | 182/5 X |
| 3,467,337 | 9/1969 | Putman | 242/107.2 |

*Primary Examiner*—James T. McCall
*Attorneys*—Herbert Furman and W. E. Finken

ABSTRACT: A belt lock includes a cam having a generally planar locking surface portion, a rib surface portion, and a circular surface portion. The cam is pivotally mounted between the walls of a support and biased to an unlocked position. The walls also pivotally mount therebetween a roller. A restraint belt from a spring-biased retractor passes along a base surface of the support, around the cam, around the roller, and exits the lock. The belt slides freely through the lock except when accelerated above a predetermined rate. When the belt is accelerated above the predetermined rate, the friction of the belt and the drag force of the retractor act on the cam to pivot the cam to an intermediate position where the rib surface portion slightly pinches the moving belt against the base surface to pivot the cam to the locked position where the generally planar locking surface portion is in generally parallel relationship with the base surface to frictionally hold the belt.

INVENTOR.
Edmond R. Gionet
BY
Herbert Furman
ATTORNEY

RESTRAINT BELT LOCK

This invention relates to belt locks and more particularly to restraint belt locks which in response to belt acceleration hold the webbing of the belt.

The belt lock of this invention is particularly adaptable for use with a restraint belt which is anchored to a retractor exerting a continual drag force on the belt in a retracting direction. The lock itself has a support with a base surface and two spaced walls between which are pivotally mounted a cam and a roller. The cam has a continuous surface including a rib surface portion and a locking surface portion on one face, and a circular surface portion on the opposite face. The cam is spring biased to an unlocked position and movable against the bias to a locked position. The belt from the retractor passes along the base surface, around the cam, around the roller and exits the lock. The circular surface portion and roller form a bight in the belt when the cam is in unlocked position.

When pulled at a rate of acceleration less than a predetermined rate, the belt slides freely through the lock. When the belt is pulled at a rate of acceleration above the predetermined rate, the friction between the belt and the cam and the drag force acting to straighten the bight in the belt generate a torque which is sufficient to overcome the biasing of the cam and to rotate the cam to an intermediate position. In the intermediate position, the rib surface portion slightly pinches the belt against the base surface to move the cam with the moving belt to the locked position. In the locked position of the cam, the locking surface portion of the cam is generally parallel to and spaced a distance slightly less than the belt thickness from the base surface to frictionally hold the belt while spreading the locking load evenly over a large surface area of the belt.

Therefore it is an advantage of the belt lock of this invention that it includes a cam moved by belt acceleration above a predetermined rate from an unlocked position to a locked position wherein the cam presses the webbing of the belt between two generally parallel surfaces of sufficient area to frictionally hold the belt therebetween and spread the locking load evenly over a large surface area of the belt. It is a further advantage that the cam is initially rotated from the unlocked position to an intermediate position by the belt acceleration above the predetermined rate with a rib surface portion on the cam slightly pinching the moving belt in the intermediate position so that the cam and the belt move as a unit, moving the cam to the locked position. It is another advantage that the cam has a protrusion which in the unlocked position of the cam cooperates with a roller to form a bight in the belt with the friction between the belt and the cam, and the drag force from the retractor acting in response to belt acceleration above the predetermined rate to straighten the bight and rotate the cam to the intermediate position.

These and other advantages of this belt lock will become apparent from the following description and drawings in which.

Figure 1:
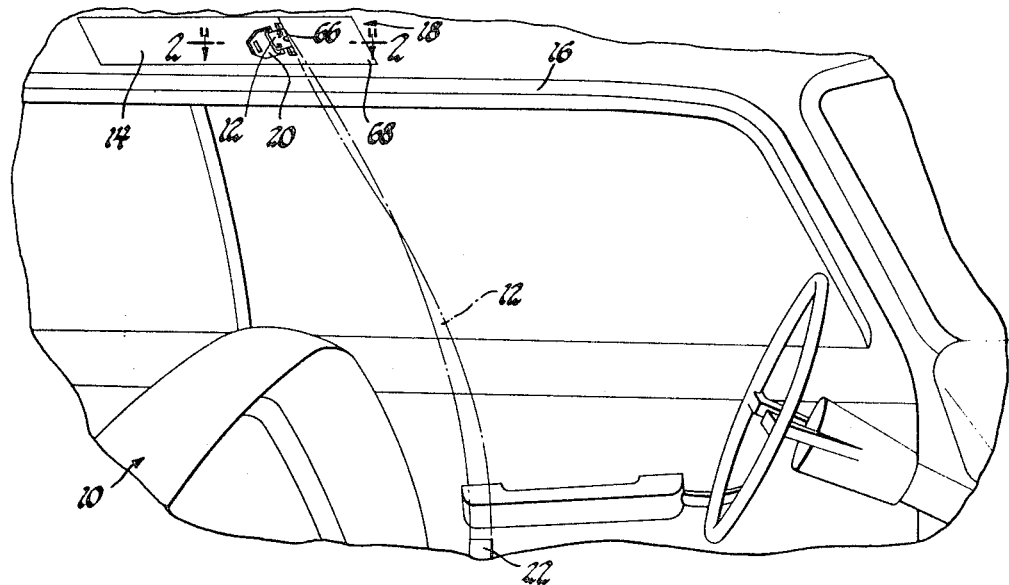
FIG. 1 is a partially cutaway view of the interior of a vehicle body having mounted therein a restraint belt and a restraint belt lock, according to this invention.

Referring now to FIG. 1, a conventional vehicle body 10 has a conventional shoulder belt 12 with one end thereof anchored to a conventional nonlocking belt retractor 14 mounted to a roof side rail 16 of the vehicle body 10. The retractor 14 is spring biased to retract the belt 12 into the retractor 14 to be stored therein. The spring action of the retractor 14 causes a drag force on the belt 12 when it is withdrawn, which tends to retard the withdrawal of the belt 12. The belt 12 from the retractor 14 passes through a belt lock 18, according to this invention, also mounted on the roof side rail 16 adjacent the retractor 14. The free end of the belt 12 has mounted thereon a conventional D-ring 20 for attachment to a conventional buckle 22 on a mating floor-mounted belt as shown in phantom lines.

Referring now to FIG. 2 through 5, the belt lock 18 in the preferred embodiment includes a channel support 24 having a smooth flat base 26 and a wall 28 at either side edge thereof. The walls 28 have interior spacing greater than the belt 12 width enabling the belt 12 to pass therebetween. The channel support 24 is mounted to the vehicle body 10 on the roof side rail 16 by bolts 30 through holes in the support 24.

Figure 3:
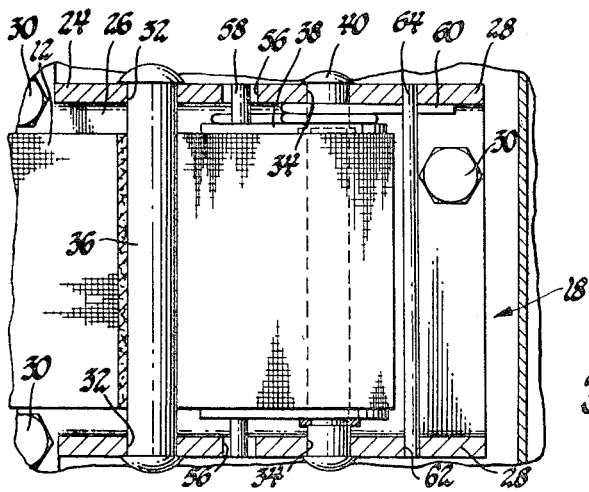
FIG. 3 is a view taken generally along the line 3-3 of FIG. 2.

The walls 28 each include a pair of holes 32 and 34 spaced a distance apart. As best seen in FIG. 3, an idle roller 36, cylindrical in shape, is passed through holes 32 to be rotatably mounted between the walls 28. The ends of the roller 36 are headed over sufficiently to prevent the roller 36 from sliding axially but not so tightly as to restrict the roller 36 from freely rotating in holes 32.

A locking cam 38 is rotatably mounted between the walls 28 by a shaft 40 which passes through a transverse hole 42 in the cam 38 and through the holes 34. The shaft 40 is headed similarly to the roller 36 to maintain it in position between the walls 28, and the cam 38 is conventionally restrained from axial movement on the shaft 40 by any suitable method such as is shown with snap rings.

The locking cam 38 is itself oblong in cross section having a major axis and two minor axes, one minor axis being longer than the other. The axis of hole 42 is located eccentrically of the cam 38 and to one side of the major axis adjacent the intersection of the major axis with the long minor axis of the cam 38. The locking cam 38 has a continuous smooth surface therearound consisting of various individual transverse surface portions whose locations are important to the operation of the belt lock 18. The cam surface has a flat locking surface portion 44 extending essentially from one end of the short minor axis almost to a respective one end of the long minor axis and located on the other side of the major axis from the axis of hole 42. Adjacent the flat locking surface portion 44 near the one end of the long minor axis is a rib surface portion 46 which merges into the flat locking surface portion 44. Extending around the cam 38 between the rib surface portion 46 and the other end of the long minor axis is a generally curved surface portion 48 which merges into a straight surface portion 50 extending from the other end of the long minor axis to the other end of the short minor axis and located on the same side of the major axis of the cam 38 as the axis of hole 42. A generally semicircular surface portion 52 joins the straight surface portion 50 to the flat locking surface portion 44 by extending around the cam between the ends of the short minor axis. It should be noted that the distance from the farthest point on the semicircular surface portion 52 to the axis of hole 42 is greater than the distance from the farthest point on the rib surface portion 46 to the axis of hole 42 giving a mechanical advantage to a force applied to the semicircular surface portion 52 for a purpose which will appear later.

Figure 2:
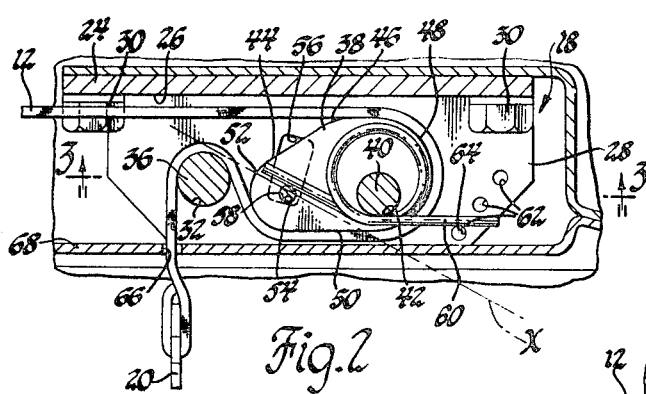
FIG. 2 is an enlarged cutaway view taken along the lines 2-2 of FIG. 1 with the belt lock in the unlocked position.
Figure 5:
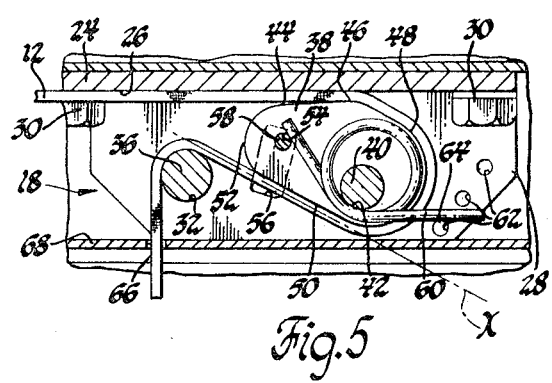
FIG. 5 is a view similar to FIG. 2 showing the lock in the locked position.

The locking cam 38 when mounted in the belt lock 18 has three distinct positions, unlocked, intermediate, and locked, in which the relationships of the cam surface portions to the other parts of the belt lock are important. In the unlocked position of the cam 38, as shown in FIG. 2, the flat locking surface portion 44 and the rib surface portion 46 are spaced from the base 26 by a distance greater than the thickness of the belt 12. The straight surface portion 50 is located generally parallel to the base 26. The semicircular surface portion 52 of the cam 38 protrudes downwardly through an imaginary flat plane X. As best seen in FIG. 5, the flat plane X is tangential to the curved surface portion 48 and the of roller 36, adjacent the base surface 26, for a purpose which will later be explained.

Figure 4:
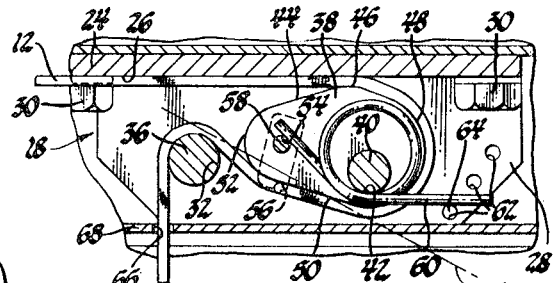
FIG. 4 is a view similar to FIG. 2 showing the lock in an intermediate position between unlocked and locked positions.

In the intermediate position, in FIG. 4, the flat locking surface portion 44 is still spaced a distance from the base 26 greater than the belt thickness but the rib surface portion 46 is now spaced a distance from the base 26 slightly less than the belt thickness. The semicircular surface portion 52 of the cam 38 still protrudes through the imaginary flat plane X but not as much as it did in the unlocked position.

In the locked position of the cam 38, as shown in FIG. 5, the flat locking surface portion 44 is located generally parallel to and spaced a distance from the base 26 slightly less than the belt thickness and the rib surface portion 46 is spaced a distance from the base 26 greater than the belt thickness. The straight surface portion 50 is now coincident with the imaginary flat plane X from the curved surface portion 48 of the cam 38 to the surface of roller 36 adjacent the base 26, so that the semicircular surface portion 52 has ceased to protrude therethrough.

Returning to the description of the cam itself, the cam 38 has a transverse hole 54 adjacent the intersection of the short minor axis with the major axis and each of the walls 28 has a slot 56 therethrough adjacent the position of the hole 54 when the cam 38 is mounted. A pin 58 of a length greater than the spacing between the walls 28 is driven into hole 54 after the cam 38 is suitably positioned with respect to the support 24 and is maintained in the hole 54 by any suitable method such as an interference fit between the pin 58 and the hole 54. The slots 56 are positioned so that the pin 58 engages one end thereof in the unlocked position of the cam 38 as shown in FIG. 2. It does not engage the other end of the slots in the locked position of the cam 38, as shown in FIG. 5, to allow full locking travel of the cam 38.

A torsion spring 60 is mounted about the shaft 40 between one side of the cam 38 and one wall 28. The walls 28 have therethrough a series of aligned holes 62 equally circumferentially spaced from the axis of hole 34 and on the opposite side of the holes 34 from the slots 56. A pin 64 is inserted in one of the sets of holes 62 and one leg of the torsion spring 60 is anchored to the pin 64 while the other leg engages pin 58 to rotatively bias the cam 38 counterclockwise to the unlocked position. The amount of counterclockwise torque exerted by the torsion spring 60 on the cam 38 is dependent on the spring rate and which of the sets of holes 62, the pin 64 is inserted.

The belt 12 coming from the retractor 14 passes along the base 26 of the support 24, between the base 26 and the cam 38, around the cam 38 on the curved surface portion 48, along the straight surface portion 50, around part of the semicircular portion 52, and around the surface of the roller 36 adjacent the base surface 26 to exit from the belt lock 18 into the interior of the vehicle through an opening 66 in a decorative housing 68 surrounding the belt lock 18. The belt 12 has a bight formed therein as it passes from the cam 38, in the unlocked position of FIG. 2, to the roller 36 on the straight surface portion 50 and the semicircular surface portion 52. The bight in the belt 12 is caused by the protrusion of the semicircular surface portion 52 through the imaginary flat plane X.

As the occupant pulls the belt 12 out of the retractor 14 and through belt lock 18 in an extending direction at a rate of acceleration below a predetermined rate, the belt 12 slides freely along the base 26 of the channel support 24, around the cam 38, around the roller 36, and out of the opening 66 to move from the retractor 14, through the belt lock 18. The clockwise torque on the cam 38 generated from the friction between the surface of the moving belt 12 and the cam 38 and from straightening of the bight in the belt 12, by the acceleration acting against the drag force on the belt 12 from the retractor 14, against the protruding straight surface portion 50 and the semicircular surface portion 52 is insufficient to overcome the counterclockwise torque of the torsion spring 60. As such, for belt movement below the predetermined rate of acceleration, the cam 38 remains in the unlocked position shown in FIG. 2 and the belt 12 moves freely from the retractor 14 through the lock 18 until withdrawn to the limit of the retractor 14.

However, if the belt 12 is withdrawn in the extending direction at a rate of acceleration exceeding the predetermined rate, the belt 12 rotates the cam 38 to the locked position to halt the movement of the belt. The rotation of the cam 38 from the unlocked position of FIG. 2 to the locked position of FIG. 5, occurs because of a clockwise torque on the cam 38 generated from the friction between the surface of the moving belt 12 and the cam 38, and from the straightening of the bight in the belt 12 by the acceleration acting against the drag force on belt 12 from the retractor 14, against the protruding straight surface position 50 and the semicircular surface portion 52 is now sufficient to overcome the counterclockwise biasing of torsion spring 60. This greater clockwise torque rotates the cam 38 towards the intermediate position of FIG. 4, to move the rib surface portion 46 towards the base 26 with sufficient force because of the mechanical advantage to slightly pinch the moving belt 12 therebetween. The pinched belt 12, as it moves on the base surface 26, adds a clockwise torque to the cam 38 to move the belt 12 and the cam 38 as a unit, and completes the rotation of the cam 38 to the locked position.

As the cam 38 reaches the locked position, shown in FIG. 5, the flat locking surface portion 44 moves into a substantially parallel spaced relationship with the base 26 to frictionally hold the belt 12 while spreading the locking load evenly on the webbing surfaces of the belt 12. It should be remembered that the rib surface portion 46 is now spaced a distance greater than the belt thickness from the base surface 26 and the straight surface portion 50 is in the imaginary tangential plane X between the curved surface portion 48 of the cam 38 and the surface of the roller 36 so that neither of these surfaces gouge the belt 12.

The belt 12 remains locked until the force thereon is released, whereupon, the biasing torque of the torsion spring 60 returns the cam 38 to the unlocked position releasing the belt 12 from the locking action of the cam 38 to be further withdrawn or retracted.

When the belt 12 is retracted, the friction between the belt 12 moving in the retracting direction and the cam 38 surfaces produces a counterclockwise torque on the cam 38 to aid the torsion spring 60 in rotating the cam 38 to and maintaining the cam 38 in the unlocked position.

The predetermined rate of acceleration of the belt, above which the cam 38 is rotated by the belt 12 against the biasing of the torsion spring 60, is primarily dependent upon the spring force of the retractor 14, the coefficient of friction between the engaging surfaces of the belt 12 and the cam 38, the shape and dimensions of the cam 38, all of which are fixed in any given lock design, and the spring rate of the torsion spring 60. While varying any one of these variables will change the predetermined rate of acceleration needed to lock the belt 12, as a practical matter, the way to obtain the desired predetermined rate of acceleration for any given design is to vary the spring rate. In the belt lock design of this embodiment, the spring rate is varied by placing the pin 64 in a different set of holes 62 to change the torque that the torsion spring 60 applies to cam 38.

Also while this embodiment uses a retractor 14 to provide a drag force on the belt 12, it would be possible to provide a sufficient drag force simply from friction on the belt 12 on the retractor side of the belt lock 18 by passing the belt 12 along a rough surface of sufficient length, by adding a sufficient number of idler rollers, or by other comparable means. By very careful attention to the design factors of the belt lock, it should be possible to design a lock which has enough drag force internally to operate itself but such careful attention is not necessary because the belt lock 18 will probably always be used in conjunction with a retractor which will provide a drag force.

While this embodiment uses two straight spaced parallel surfaces to frictionally hold the belt, spaced parallel surfaces of any shape could be used as design requirement dictate.

Thus, a belt lock according to this invention when used in conjunction with a retractor, in response to belt acceleration above a predetermined rate holds the belt between two substantially parallel surfaces to thereby spread the locking load evenly along the belt webbing.

I claim:

1. In a combination with a restraint belt biased in a retracting direction by a retractor, a belt lock comprising, a support having a base surface, a cam mounted on the support for movement between locked and unlocked positions through an intermediate position, means biasing the cam to the unlocked position, the cam having a continuous surface thereabout including a locking surface portion spaced a distance from the base surface greater than the thickness of the belt in the unlocked position of the cam and located substantially parallel to the base surface and spaced a distance from the base surface slightly less than the thickness of the belt in the locked position of the cam, a rib surface portion adjacent the locking surface portion and spaced a distance from the base surface greater than the belt thickness in both the unlocked position and locked position of the cam, the rib surface portion being spaced a distance from the base surface slightly less than the belt thickness in the intermediate position, the belt extending along the base surface between the locking surface portion and the base surface and around part of the continuous surface of the cam, the belt being freely movable through the lock in an extending direction from the base surface to the cam surface when subjected to a rate of acceleration below a predetermined rate, and means responsive to a rate of belt acceleration above the predetermined rate for moving the cam against the action of the biasing means from the unlocked position to the intermediate position, the rib surface portion in the intermediate position slightly pinching the belt against the base surface to move the cam with the belt to the locked position wherein the locking surface portion presses the belt against the base surface to stop the movement of the belt in the extending direction.

2. In combination with a restraint belt biased in a retracting direction by a retractor, a belt lock comprising, a support having a base surface, a cam pivotally mounted on the support for movement between locked and unlocked positions through an intermediate position, means biasing the cam to the unlocked position, the cam having a continuous surface thereabout including a locking surface portion spaced a distance from the base surface greater than the thickness of the belt in the unlocked position of the cam and located substantially parallel to the base surface and spaced a distance from the base surface slightly less than the thickness of the belt in the locked position of the cam, a rib surface portion adjacent the locking surface portion and spaced a distance from the base surface greater than the belt thickness in both the unlocked and locked positions of the cam, the rib surface portion being spaced a distance from the base surface slightly less than the belt thickness in the intermediate position, the belt extending along the base surface, between the locking surface portion and the base surface and around the cam along part of the continuous surface, for belt movement below a predetermined rate of acceleration the friction between the belt and the cam surface generating a torque which is insufficient to overcome the action of the biasing means thereby allowing the belt to slide freely through the lock, movement of the belt in the extending direction at a rate of acceleration above the predetermined rate increasing the torque generated by the friction between the cam surface and the belt sufficiently to overcome the action of the biasing means and to move the cam from the unlocked position to the intermediate position whereupon the rib surface slightly pinches the belt against the base surface to move the cam and the belt to locked position wherein the locking surface portion presses the belt against the base surface to stop the movement of the belt in the extending direction.

3. A belt lock as recited in claim 2 in which the biasing means is adjustable to vary the amount of biasing force and thereby change the predetermined rate of acceleration of the belt needed to move the cam.

4. In combination with a restraint belt biased in a retracting direction by a retractor, a belt lock comprising, a support having a base surface, a roller rotatably mounted on the support and spaced from the base surface, a cam pivotally mounted on the support for movement between locked and unlocked positions through an intermediate position, means biasing the cam to the unlocked position, the cam having a continuous surface thereabout including a locking surface portion spaced a distance from the base surface greater than the thickness of the belt in the unlocked position and located substantially parallel to the base surface and spaced a distance from the base surface slightly less than the thickness of the belt in the locked position of the cam, a rib surface portion adjacent to the locking surface portion and spaced from the base surface a distance greater than the belt thickness in both the locked and unlocked positions of the cam, the rib surface portion being spaced a distance from the base surface slightly less than the belt thickness in the intermediate position of the cam, and a circular surface portion adjacent the opposite side of the locking surface portion of the cam from the rib surface portion, the belt extending along the base surface between the locking surface portion and the base surface around part of the cam surface including the circular surface portion and around the roller, the circular surface portion cooperating with the roller to form a bight in the belt between the cam and the roller, movement of the belt in an extending direction from the base surface to the cam at a rate below a predetermined rate of acceleration moving the belt along the base surface around the cam and around the roller, for belt movement below the predetermined rate of acceleration the friction between the belt and the cam surface and the force of the bight in the belt straightening against the circular surface portion generating a torque insufficient to overcome the action of the biasing means thereby allowing the belt to slide freely through the lock, movement of the belt in the extending direction at a rate of acceleration above the predetermined rate increasing the torque generated by the friction between the cam surface and the belt and straightening the bight of the belt against the circular surface portion to overcome the biasing of the biasing means and to move the cam from the unlocked position to the intermediate position whereupon the rib surface portion pinches the belt against the base surface to move the cam and the belt to the locked position wherein the locking surface portion presses the belt against the base surface to stop movement of the belt in the extending direction.

5. In combination with a belt biased in a retracting direction by a retractor, a belt lock comprising, a support having a base surface and a pair of spaced walls, a roller rotatably mounted between the walls and spaced from the base surface, a cam pivotally mounted between the walls for movement between locked and unlocked positions through an intermediate position, spring means acting between the support and the cam to bias the cam toward the unlocked position, stop means locating the cam in the unlocked position against the action of the spring means, the cam having a continuous surface including a locking surface portion spaced a distance from the base surface greater than the thickness of the belt in the unlocked position of the cam and located substantially parallel to the base surface and spaced a distance from the base surface slightly less than the belt thickness in the locked position of the cam, a rib surface portion adjacent to the locking surface portion and spaced a distance from the base surface greater than the belt thickness in both the unlocked and locked positions of the cam, the rib surface portion being spaced a distance from the base surface slightly less than the belt thickness in the intermediate position of the cam, and a circular surface portion on the opposite side of the locking surface portion of the cam from the rib surface portion, the belt extending from the retractor along the base surface between the locking surface portion and the base surface around part of the continuous surface of the cam including the circular surface portion and around the roller, the circular surface portion cooperating with the roller to form a bight in the belt between the cam and roller, movement of the belt in an extending direction at a rate below a predetermined rate of acceleration moving the belt along the base surface and around the cam and roller, for belt movement below the predetermined rate of acceleration the friction between the belt and the cam surface and the drag force on the belt from the retractor resisting the acceleration and straightening the bight in the belt against the circular surface portion generating a torque insufficient to overcome the action of the spring means thereby allowing the belt to slide freely through the lock, movement of the belt in the extending direction at a rate of acceleration above the predetermined rate increasing the torque generated by the between the cam surface and the belt and by the drag force straightening the bight against the circular surface portion of the cam to generate a torque sufficient to overcome the action of the spring means and to move the cam from the unlocked position to the intermediate position whereupon the rib surface portion pinches the moving belt against the base surface to move the cam and the belt to the locked position wherein the locking surface portion presses the belt against the base surface to stop movement of the belt in the extending direction and to hold the belt, movement of the belt in the retracting direction and the action of the spring means beginning movement of the cam from the locked position to the unlocked position and the torque generated by the friction between the belt and the cam surface aiding the action of the spring means to complete movement of the cam from the locked position to the unlocked position again allowing the belt to move freely in either direction.

UNITED STATES PATENT OFFICE
CERTIFICATE OF CORRECTION

Patent No. 3,592,507      Dated July 13, 1971

Inventor(s)   Edmond R. Gionet

It is certified that error appears in the above-identified patent and that said Letters Patent are hereby corrected as shown below:

Column 4, line 7, "position" should read -- portion --.
Column 7, line 8, before "between" insert -- friction --.

Signed and sealed this 8th day of February 1972.

(SEAL)
Attest:

EDWARD M. FLETCHER, JR.
Attesting Officer

ROBERT GOTTSCHALK
Commissioner of Patents